(12) United States Patent
Mathiszik

(10) Patent No.: US 10,119,391 B2
(45) Date of Patent: *Nov. 6, 2018

(54) INDICATOR AND METHOD OF VERIFYING A TOOL HAS REACHED A PORTION OF A TUBULAR

(71) Applicant: Holger Mathiszik, Eicklingen (DE)

(72) Inventor: Holger Mathiszik, Eicklingen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/179,200

(22) Filed: Jun. 10, 2016

(65) Prior Publication Data

US 2016/0281495 A1    Sep. 29, 2016

Related U.S. Application Data

(63) Continuation of application No. 13/357,159, filed on Jan. 24, 2012, now Pat. No. 9,376,909.

(51) Int. Cl.
| | | |
|---|---|---|
| *E21B 47/09* | (2012.01) | |
| *E21B 17/10* | (2006.01) | |
| *E21B 47/12* | (2012.01) | |
| *E21B 47/14* | (2006.01) | |
| *G01V 11/00* | (2006.01) | |

(52) U.S. Cl.
CPC .......... *E21B 47/09* (2013.01); *E21B 17/1078* (2013.01); *E21B 47/122* (2013.01); *E21B 47/14* (2013.01); *G01V 11/002* (2013.01)

(58) Field of Classification Search
CPC .... E21B 17/1078; E21B 47/09; E21B 47/122; E21B 47/14; E21B 47/04; E21B 23/00; E21B 47/0905

See application file for complete search history.

(56) References Cited

U.S. PATENT DOCUMENTS

| | | | | |
|---|---|---|---|---|
| 2,007,465 | A | * | 7/1935 | Burt .................... E21B 47/0005 116/206 |
| 4,206,810 | A | | 6/1980 | Blackman |
| 5,397,893 | A | | 3/1995 | Minette |
| 5,494,105 | A | | 2/1996 | Morris |
| 5,589,825 | A | | 12/1996 | Pomerleau |

(Continued)

FOREIGN PATENT DOCUMENTS

| | | |
|---|---|---|
| WO | 9213167 A1 | 8/1992 |
| WO | 2009123467 | 10/2009 |

OTHER PUBLICATIONS

Notification of Transmittal of the International Search Report and the Written Opinion of the International Searching Authority, or the Declaration; PCT/US2013/022091; dated May 8, 2013; 10 pages.

*Primary Examiner* — Caroline N Butcher
(74) *Attorney, Agent, or Firm* — Cantor Colburn LLP

(57) ABSTRACT

An indicator including a body configured to be run within a tubular from a first portion to a second portion of the tubular. A sensor disposed at the body configured to detect when a tool run through the tubular has reached the body. A signal generator configured to send notification that the tool has reached the body; and a plunger configured to cause the signal generator to send notification upon being urged relative to the body. A method of verifying a tool.

25 Claims, 2 Drawing Sheets

(56) References Cited

U.S. PATENT DOCUMENTS

| | | |
|---|---|---|
| 6,429,653 B1 | 8/2002 | Kruspe et al. |
| 6,585,042 B2 | 7/2003 | Summers |
| 6,614,718 B2 | 9/2003 | Cecconi et al. |
| 6,791,469 B1 | 9/2004 | Rao et al. |
| 6,990,045 B2 | 1/2006 | Jackson |
| 7,000,692 B2 | 2/2006 | Hosie et al. |
| 7,093,672 B2 | 8/2006 | Seydoux et al. |
| 7,128,167 B2 | 10/2006 | Dunlop et al. |
| 7,302,346 B2 | 11/2007 | Chang et al. |
| 7,557,339 B2 | 7/2009 | Poland et al. |
| 2002/0066577 A1 | 6/2002 | Dewey |
| 2007/0272411 A1 | 11/2007 | Lopez De Cardenas et al. |
| 2008/0272931 A1 | 11/2008 | Auzerais et al. |
| 2009/0260876 A1 | 10/2009 | Gleitman |
| 2010/0282461 A1 | 11/2010 | Yee |

\* cited by examiner

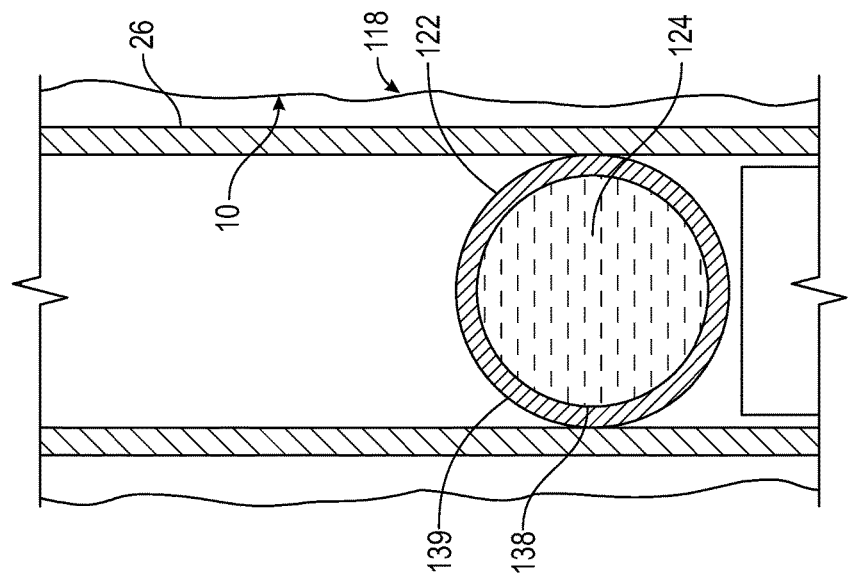
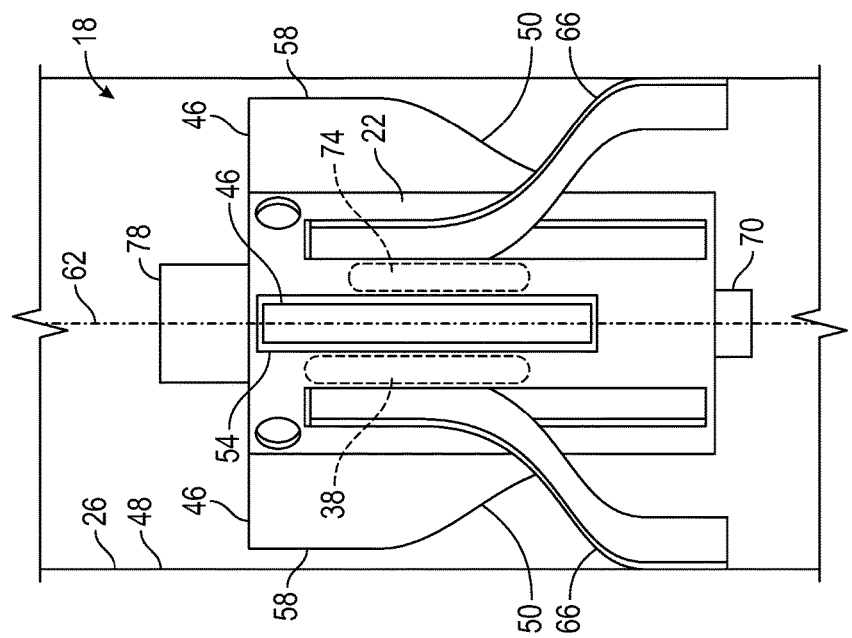

INDICATOR AND METHOD OF VERIFYING A TOOL HAS REACHED A PORTION OF A TUBULAR

CROSS REFERENCE TO RELATED APPLICATIONS

This application is a Continuation of U.S. application Ser. No. 13/357,159 Filed on Jan. 24, 2012, the disclosure of which is incorporated by reference herein in its entirety.

BACKGROUND

It is common in tubular systems to run a tool through the tubular to a desired position therewithin. Such running is typically done by pumping fluid or by dropping the tool and relying on gravity to move it through the tubular. Depending upon parameters of the tool, the tubular and the fit therebetween, however, it may be difficult to move the tool therethrough. The tool may become hung prior to reaching the desired position and the rate of running may slow thereby consuming valuable time that could be used more productively. The art is therefore always receptive to devices and methods to address the aforementioned shortcomings.

BRIEF DESCRIPTION

Disclosed herein is an indicator including a body configured to be run within a tubular from a first portion to a second portion of the tubular; a sensor disposed at the body configured to detect when a tool run through the tubular has reached the body; a signal generator configured to send notification that the tool has reached the body; and a plunger configured to cause the signal generator to send notification upon being urged relative to the body.

Further disclosed is an indicator including a body configured to be run within a tubular from a first portion to a second portion of the tubular; a sensor disposed at the body configured to detect when a tool run through the tubular has reached the body; and a signal generator being configured to send notification that the tool has reached the body, wherein the signal generator is configured to emit a substance stored therewithin.

Further disclosure is an indicator including a body configured to be run within a tubular from a first portion to a second portion of the tubular; a sensor disposed at the body configured to detect when a tool run through the tubular has reached the body; and a signal generator being configured to send notification that the tool has reached the body, wherein the body is the sensor and is configured to sense that the tool has reached the body by rupturing of the body.

Further disclosed is a method of verifying a tool has reached a second portion of a tubular including running an indicator through the tubular from a first portion to a second portion thereof; running a tool through the tubular to the indicator; sensing that the tool has reached the indicator; and sending notification from the indicator that the tool has reached the indicator wherein sending notification includes discharging a substance from the indicator.

Further disclosed is a method of verifying a tool has reached a second portion of a tubular including running an indicator through the tubular from a first portion to a second portion thereof; running a tool through the tubular to the indicator; sensing that the tool has reached the indicator; and sending notification from the indicator that the tool has reached the indicator, wherein the sensing includes compressing a plunger.

Further disclosed is an indicator including a body configured to be run within a drill string from a first portion to a second portion of the drill string; a sensor disposed at the body configured to detect when a tool run through the drill string has reached the body; a signal generator configured to send notification that the tool has reached the body.

BRIEF DESCRIPTION OF THE DRAWINGS

The following descriptions should not be considered limiting in any way. With reference to the accompanying drawings, like elements are numbered alike:

FIG. 2 depicts a side view of an indicator disclosed herein; and

FIG. 3 depicts a cross sectional view of an alternate embodiment of an indicator disclosed herein.

DETAILED DESCRIPTION

Figure 1:
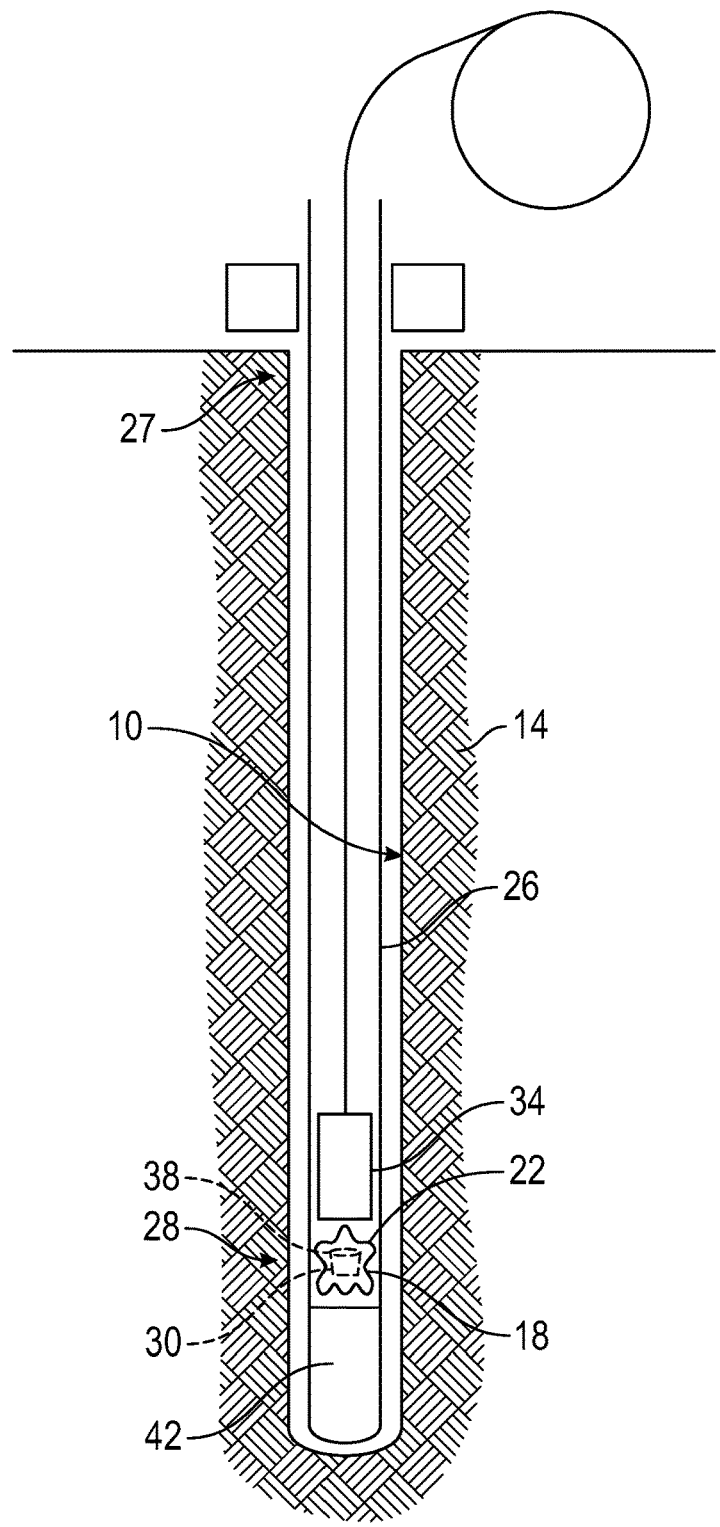
FIG. 1 depicts a schematic view of a borehole employing the indicator disclosed herein.

A detailed description of one or more embodiments of the disclosed apparatus and method are presented herein by way of exemplification and not limitation with reference to the Figures.

Referring to FIG. 1, a borehole 10 in an earth formation 14 is shown wherein an embodiment of an indicator 18 disclosed herein is deployed. The indicator 18 has a body 22 configured to be run through a tubular 26, shown in this embodiment as a drill string, from a first portion 27 to a second portion 28 of the tubular 26. Illustrated in this embodiment is a sensor 30 disposed at the body 22 is configured to detect that a tool 34, run through the tubular 26, has reached the indicator 18. The indicator 18 also includes a signal generator 38 configured to send notification that the tool 34 has reached the indicator 18 and thus the second portion 28 of the tubular 26.

The embodiment of the indicator 18, as illustrated in FIG. 1, is used to detect when a measuring device (the tool 34) has reached total depth of a wellbore (the borehole 10) in a hydrocarbon recovery application. The tubular 26, as illustrated, is a drill string with a structure 42, illustrated herein as a bottom hole assembly (BHA) at the second portion 28, which in this case is the end of the tubular 26 located at the total depth (TD) or bottom of the borehole 10. In such an application it is important to know that the measurement device 34 is positioned at the BHA 42 for meaningful data to be acquired. Dimensionally the measurement device 34 typically fits rather tightly within inner dimensions of the drill string 26 and thus is prone to hang up on occasion when being run therethrough. This tight fit also limits a rate at which the measurement device 34 can be run. In contrast, the body 22 of the indicator 18 is relatively small in comparison to inner dimensions of the drill string 26 and accordingly is less likely to get hung within the drill string 26. Additionally, the indicator 18 can be run through the drillstring 26 at high pressures and thus high run rates and is constructed to withstand these conditions as well as impacts upon reaching TD and from being contacted by the tool 34. The indicator 18 disclosed herein then provides an operator with greater confidence that the measurement tool 34 has indeed reached the BHA 42. Although in this embodiment the structure 42 is a BHA that serves as a stop for the indicator 18, the structure 42 can be anything sufficiently sized and positioned to stop the indicator 18 upon running thereagainst.

Referring to FIG. 2, the body 22 of the indicator 18 of this embodiment includes wings 46 that protrude radially there-from. The wings 46 can have leading edges 50 that are angled to resist catching on any debris or anything else that may be attached to an inner wall 48 of the tubular 26 thereby decreasing chances that the indicator 18 will get hung up within the tubular 26 prior to reaching the second portion 28. The wings 46 can be fixedly attached to the body 22 or movably attached such that they can move radially inwardly into slots 54, as if, for example, against a bias. Radially constant portions 58 of each wing 46 may be longitudinally dimensioned to align an axis 62 of the body 22 relative to an axis of the tubular 26 while running therethrough.

Additionally, the body 22 may have stabilizers 66 that are deployable once the indicator 18 has reached the second portion 28 to radially orient and fix or latch the indicator 18 to the tubular 26. At least portions of the stabilizers 66 in this embodiment can move radially outwardly relative to the body 22 that can be controlled by a ratcheting mechanism (not shown) to prevent retraction thereof and maintain contact between the stabilizers 66 and the inner wall 48 after such contact has been established. A release member 70 can be configured to cause the stabilizers 66 to radially deploy when urged relative to the body 22 by contact with the second portion 28, for example. By extending radially outwardly from the body 22, the stabilizers 66 and the wings 46 leave sufficient flow area in the annular space between the body 22 and the walls 48 for fluid flow such as for mud circulation, for example.

Orienting the body 22 relative to the tubular 26 with the stabilizers 70 can also assist in detecting that the tool 34 has reached the indicator 18. The sensor 30 disposed at the indicator 18 is configured to detect when the tool 34 has reached the indicator 18. The sensor 30 can detect the tool 34 in various ways including, via acceleration or a pressure change resulting from impact of the tool 34 with the indicator 18. In such cases the sensor 30 may include an accelerometer or a pressure switch. Alternately, the sensor 30 can include a mechanical actuator that actuates when a plunger 78 extending from the body 22 is moved relative to the body 22 when contacted by the tool 34, for example. The plunger 78 can extend from the body 22 in an orientation (upwards in the Figure) so that it is contacted directly by the tool 34 when the tool 34 reaches the indicator 18.

The sensor 30 is in functional communication with the signal generator 38 to cause the signal generator 38 to send notification upon the sensor 30 detecting that the tool 34 has reached the indicator 18. The signal generator 38 can send the notification in different forms. For example, the signal generator 38 can emit a substance stored within the indicator 18 that can be detected by another remote device positioned at the second portion 28 or at the first portion 27. Substances contemplated include a colored die, a particle tracer and a radioactive tracer, although the invention is not limited to these. Alternatively, the signal generator 38 can configured to emit a signal, rather than a substance, receptive by a device positioned at the second portion 28 or at the first portion 27. Signals contemplated include emitting electromagnetic energy, radioactive energy, seismic energy and acoustic energy. However the signals emitted are not are not limited to these.

In alternate embodiments the indicator 18 may be equipped so that the signal generator 38, or another separate signal generator, sends notification that the indicator 18, itself, has reached the second portion 28. The means of sending such a notification can be the same as those described above and employed by the signal generator 38 or can be in another form.

Referring to FIG. 3, an alternate embodiment of an indicator disclosed herein is illustrated at 118. The embodiment of the indicator 118 is simpler than the indicator 18 in that a sensor 139 and a signal generator 138 are an integral part of the indicator 118. The indicator 118 includes a body 122, in the form of a hollow sphere in this embodiment, although other shapes could just as well be employed. The body 122 is filled with media 124 that could be a die, a radioactive fluid, or other mater pumpable through the tubular 26 or wellbore 10 and detectable remotely. Such detection provides indication that the tool 34 has impacted with the body 122 causing it to rupture thereby releasing the media 124 in the process.

Set forth below are some embodiments of the foregoing disclosure:

Embodiment 1

An indicator comprising: a body configured to be run within a tubular from a first portion to a second portion of the tubular; a sensor disposed at the body configured to detect when a tool run through the tubular has reached the body; a signal generator configured to send notification that the tool has reached the body; and a plunger configured to cause the signal generator to send notification upon being urged relative to the body.

Embodiment 2

The indicator of any of the proceeding embodiments, wherein the tool is a measurement tool.

Embodiment 3

The indicator of any of the proceeding embodiments, wherein the indicator is configured to be pumped through the tubular.

Embodiment 4

The indicator of any of the proceeding embodiments, further comprising wings extendable from the body configured to orient the body relative to the tubular while being run therethrough.

Embodiment 5

The indicator of any of the proceeding embodiments, wherein the wings are radially movable relative to the body.

Embodiment 6

The indicator of any of the proceeding embodiments, further comprising stabilizers configured to fix the indicator to the tubular.

Embodiment 7

The indicator of any of the proceeding embodiments, further comprising at least one stabilizer configured to extend from the body to engage with the tubular after the body has reached the second portion.

Embodiment 8

The indicator of any of the proceeding embodiments, further comprising a release member configured to cause the at least one stabilizer to extend from the body upon the release member being urged relative to the body.

Embodiment 9

The indicator of any of the proceeding embodiments, wherein the indicator is configured to self-orient relative to the tubular upon reaching the second portion.

Embodiment 10

The indicator of any of the proceeding embodiments, wherein the sensor includes at least one of an accelerometer, a switch and a mechanical actuator.

Embodiment 11

An indicator comprising: a body configured to be run within a tubular from a first portion to a second portion of the tubular; a sensor disposed at the body configured to detect when a tool run through the tubular has reached the body; and a signal generator being configured to send notification that the tool has reached the body, wherein the signal generator is configured to emit a substance stored therewithin.

Embodiment 12

The indicator of any of the proceeding embodiments, wherein the substance includes at least one of a colored die, a particle tracer and a radioactive tracer.

Embodiment 13

The indicator of any of the proceeding embodiments, wherein the signal generator is configured to emit a signal.

Embodiment 14

The indicator of any of the proceeding embodiments, wherein the signal emitted includes at least one of electromagnetic energy, radioactive energy, seismic energy and acoustic energy.

Embodiment 15

The indicator of any of the proceeding embodiments, wherein the signal generator is configured to send notification that the body has been contacted by the tool.

Embodiment 16

The indicator of any of the proceeding embodiments, wherein the signal generator is configured to send notification that the indicator has reached the second portion.

Embodiment 17

An indicator comprising: a body configured to be run within a tubular from a first portion to a second portion of the tubular; a sensor disposed at the body configured to detect when a tool run through the tubular has reached the body; and a signal generator being configured to send notification that the tool has reached the body, wherein the body is the sensor and is configured to sense that the tool has reached the body by rupturing of the body.

Embodiment 18

The indicator of any of the proceeding embodiments, wherein the signal generator includes media initially stored within the body that is detectable upon release from the body upon rupture of the body.

Embodiment 19

A method of verifying a tool has reached a second portion of a tubular comprising: running an indicator through the tubular from a first portion to a second portion thereof; running a tool through the tubular to the indicator; sensing that the tool has reached the indicator; and sending notification from the indicator that the tool has reached the indicator wherein sending notification includes discharging a substance from the indicator.

Embodiment 20

The method of verifying a tool has reached a second portion of a tubular of any of the proceeding embodiments, wherein the running includes pumping.

Embodiment 21

The method of verifying a tool has reached a second portion of a tubular of any of the proceeding embodiments, wherein the fixing includes extending stabilizers.

Embodiment 22

The method of verifying a tool has reached a second portion of a tubular of any of the proceeding embodiments, further comprising orienting the indicator relative to the tubular after reaching the second portion.

Embodiment 23

A method of verifying a tool has reached a second portion of a tubular comprising: running an indicator through the tubular from a first portion to a second portion thereof; running a tool through the tubular to the indicator; sensing that the tool has reached the indicator; and sending notification from the indicator that the tool has reached the indicator, wherein the sensing includes compressing a plunger.

Embodiment 24

An indicator comprising: a body configured to be run within a drill string from a first portion to a second portion of the drill string; a sensor disposed at the body configured to detect when a tool run through the drill string has reached the body; a signal generator configured to send notification that the tool has reached the body.

Embodiment 25

The indicator of any of the proceeding embodiments, wherein the tool is a measurement tool The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first,"

"second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed:

1. An indicator comprising:
    a body configured to be run within a tubular from a first portion to a second portion of the tubular;
    a sensor disposed at the body configured to detect when a tool run through the tubular has reached the body;
    a signal generator configured to send notification that the tool has reached the body; and
    a plunger configured to cause the signal generator to send notification upon being urged relative to the body.

2. The indicator of claim 1, wherein the tool is a measurement tool.

3. The indicator of claim 1, wherein the indicator is configured to be pumped through the tubular.

4. The indicator of claim 1, further comprising wings extendable from the body configured to orient the body relative to the tubular while being run therethrough.

5. The indicator of claim 4, wherein the wings are radially movable relative to the body.

6. The indicator of claim 1, further comprising stabilizers configured to fix the indicator to the tubular.

7. The indicator of claim 1, further comprising at least one stabilizer configured to extend from the body to engage with the tubular after the body has reached the second portion.

8. The indicator of claim 1, further comprising a release member configured to cause the at least one stabilizer to extend from the body upon the release member being urged relative to the body.

9. The indicator of claim 1, wherein the indicator is configured to self-orient relative to the tubular upon reaching the second portion.

10. The indicator of claim 1, wherein the sensor includes at least one of an accelerometer, a switch and a mechanical actuator.

11. The indicator of claim 1, wherein the signal generator is configured to emit a signal.

12. The indicator of claim 11, wherein the signal emitted includes at least one of electromagnetic energy, radioactive energy, seismic energy and acoustic energy.

13. The indicator of claim 1, wherein the signal generator is configured to send notification that the body has been contacted by the tool.

14. The indicator of claim 1, wherein the signal generator is configured to send notification that the indicator has reached the second portion.

15. The indicator of claim 14, wherein the signal generator includes media initially stored within the body that is detectable upon release from the body upon rupture of the body.

16. An indicator comprising:
    a body configured to be run through a tubular from a first portion to a second portion of the tubular;
    a sensor disposed at the body configured to detect when a tool run through the tubular has reached the body; and
    a signal generator being configured to send notification that the tool has reached the body, wherein the signal generator is configured to emit a substance stored therewithin.

17. The indicator of claim 16, wherein the substance includes at least one of a colored die, a particle tracer and a radioactive tracer.

18. A method of verifying a tool has reached a second portion of a tubular comprising:
    running an indicator as claimed in claim 16 through the tubular from a first portion to a second portion thereof;
    running a tool through the tubular to the indicator;
    sensing that the tool has reached the indicator; and
    sending notification from the indicator that the tool has reached the indicator wherein sending notification includes discharging a substance from the indicator.

19. The method of verifying a tool has reached a second portion of a tubular of claim 18, wherein the running includes pumping.

20. The method of verifying a tool has reached a second portion of a tubular of claim 18, wherein the fixing includes extending stabilizers.

21. The method of verifying a tool has reached a second portion of a tubular of claim 18, further comprising orienting the indicator relative to the tubular after reaching the second portion.

22. An indicator comprising:
    a body configured to be run through a tubular from a first portion to a second portion of the tubular;
    a sensor disposed at the body configured to detect when a tool run through the tubular has reached the body; and
    a signal generator being configured to send notification that the tool has reached the body, wherein the body is the sensor and is configured to sense that the tool has reached the body by rupturing of the body.

23. A method of verifying a tool has reached a second portion of a tubular comprising:
    running an indicator through the tubular from a first portion to a second portion thereof;
    running a tool through the tubular to the indicator;
    sensing that the tool has reached the indicator; and sending notification from the indicator that the tool has reached the indicator, wherein the sensing includes compressing a plunger.

24. An indicator comprising:
a body configured to be run within a drill string from a first portion to a second portion of the drill string;
a sensor disposed on the body and run through the drill string with the body configured to detect when a tool run through the drill string has reached the body;
a signal generator on the body and run through the drill string with the body configured to send notification that the tool has reached the body.

25. The indicator of claim 24, wherein the tool is a measurement tool.

\* \* \* \* \*